United States Patent
Terry et al.

(10) Patent No.: US 7,510,158 B1
(45) Date of Patent: Mar. 31, 2009

(54) MULTI-CHAMBER VEHICULAR BEVERAGE CONTAINER HOLDER WITH COMMON ACTUATOR

(75) Inventors: Warren Terry, Lawton, MI (US); Antonio Crespo, Jr., Three Rivers, MI (US); Bharat Vennapusa, West Bloomfield, MI (US); Thomas F. Morse, Milford, MI (US); Nicholas A. Bee, Pleasant Ridge, MI (US)

(73) Assignee: Summit Polymers, Inc., Kalamazoo, MI (US)

( * ) Notice: Subject to any disclaimer, the term of this patent is extended or adjusted under 35 U.S.C. 154(b) by 461 days.

(21) Appl. No.: 11/161,577

(22) Filed: Aug. 8, 2005

Related U.S. Application Data (60) Provisional application No. 60/593,770, filed on Feb. 11, 2005.

(51) Int. Cl.
  *B60R 7/04* (2006.01)
  *B60R 7/06* (2006.01)
(52) U.S. Cl. .............. 248/313; 248/311.2; 224/926; 224/275; 224/483; 224/485; 220/529; 220/530; 220/551; 220/737; 220/738; 296/24.34
(58) Field of Classification Search ............ 220/345.1, 220/529, 737, 8; 224/275, 281, 483, 485, 224/926; 248/27.1, 27.3, 311.2, 313; 269/190, 269/229, 43, 95; 297/188.14, 188.17; 312/246; 403/59
See application file for complete search history.

(56) References Cited

U.S. PATENT DOCUMENTS

| | | | |
|---|---|---|---|
| 4,511,072 A | | 4/1985 | Owens |
| 4,852,932 A | * | 8/1989 | Komeya et al. ............ 296/37.9 |
| 4,934,674 A | * | 6/1990 | Bernstein ..................... 269/43 |
| 4,943,111 A | * | 7/1990 | VanderLaan ........... 297/188.17 |
| 5,098,073 A | * | 3/1992 | Lenz ........................... 269/43 |
| 5,149,032 A | | 9/1992 | Jones et al. |
| 5,284,314 A | * | 2/1994 | Misaras et al. ........... 248/311.2 |
| 5,351,943 A | * | 10/1994 | Milz .......................... 269/246 |
| 5,385,325 A | | 1/1995 | Rigsby |
| 5,445,350 A | | 8/1995 | Rigsby |
| 5,457,745 A | * | 10/1995 | Wang ......................... 379/454 |
| 5,520,313 A | | 5/1996 | Toshihide |
| 5,524,958 A | * | 6/1996 | Wieczorek et al. ..... 297/188.17 |
| 5,573,214 A | | 11/1996 | Jones et al. |
| 5,702,041 A | | 12/1997 | Sun et al. |
| 5,833,194 A | | 11/1998 | Jones et al. |
| 5,878,986 A | * | 3/1999 | Sun et al. ................. 248/311.2 |
| 6,039,296 A | | 3/2000 | Nishina et al. |

(Continued)

*Primary Examiner*—Nathan J Newhouse
*Assistant Examiner*—Ned A Walker
(74) *Attorney, Agent, or Firm*—McGarry Bair PC (57) ABSTRACT

A vehicular beverage container holder comprises a receptacle with an elongated compartment and an adjuster assembly mounted to the receptacle to define separate beverage container compartments within the compartment for receiving individual beverage containers. The adjuster assembly comprises a body and a pair of adjusters slidably mounted to and extending from opposite sides of the body. Rotation of a knob and gear assembly of the adjuster assembly effects movement of the adjusters relative to the body to adjust the sizes of openings for the beverage container compartments for accommodating a range of beverage container sizes. Additionally, the knob and gear assembly includes a slip clutch mechanism that enables movement of one of the adjusters while movement of the other of the adjusters is retarded by a beverage container.

21 Claims, 10 Drawing Sheets

U.S. PATENT DOCUMENTS

| | | |
|---|---|---|
| 6,076,793 A | 6/2000 | Yamamoto |
| 6,092,775 A | 7/2000 | Gallant |
| 6,206,260 B1 | 3/2001 | Covell et al. |
| 6,230,948 B1 | 5/2001 | Steiger et al. |
| 6,320,962 B1 | 11/2001 | Eisenbraun |
| 6,361,008 B1 | 3/2002 | Gravenstreter |
| 6,450,468 B1 * | 9/2002 | Hamamoto ............... 248/311.2 |
| 6,464,187 B1 * | 10/2002 | Bieck et al. ............... 248/311.2 |
| 6,468,457 B2 | 10/2002 | Corrion et al. |
| 6,494,428 B1 | 12/2002 | Robbins et al. |
| 6,691,967 B2 | 2/2004 | Kaupp |
| 6,702,243 B2 | 3/2004 | Takeichi |
| 6,715,727 B2 | 4/2004 | Sambonmatsu |
| 6,755,382 B1 * | 6/2004 | Melnick .................. 248/316.8 |
| 6,779,770 B2 * | 8/2004 | Kaupp ..................... 248/311.2 |
| 6,983,918 B1 * | 1/2006 | Leasure ................... 248/311.2 |
| 7,168,669 B2 * | 1/2007 | Park ........................ 248/311.2 |
| 2002/0060386 A1 * | 5/2002 | Konieczny ................. 269/56 |
| 2003/0094557 A1 * | 5/2003 | Takahashi ................ 248/311.2 |
| 2003/0098402 A1 * | 5/2003 | Kaupp ..................... 248/311.2 |
| 2004/0079850 A1 * | 4/2004 | Takahashi ................ 248/311.2 |
| 2005/0072889 A1 * | 4/2005 | Park ........................ 248/311.2 |
| 2006/0237612 A1 * | 10/2006 | Thomas ................... 248/311.2 |

* cited by examiner

MULTI-CHAMBER VEHICULAR BEVERAGE CONTAINER HOLDER WITH COMMON ACTUATOR

CROSS REFERENCE TO RELATED APPLICATIONS

This application claims the benefit of U.S. Patent Application Ser. No. 60/593,770, filed Feb. 11, 2005.

FIELD OF THE INVENTION

The invention relates generally to a beverage container holder for use in a vehicle and more particularly to a vehicular beverage container holder comprising a pair of adjustable members for sizing a pair of beverage container openings.

DESCRIPTION OF THE RELATED ART

Today, people tend to spend a good amount of time in their automobiles and often eat meals and consume beverages in the vehicle when traveling from one place to another. Consequently, automobiles are commonly equipped with a beverage container holder so that persons in the vehicle do not have to hold the beverage container at all times. In the front cabin of a vehicle, the beverage container holder is generally located between the passenger seat and the driver seat so that both the passenger and the driver can access the beverage container holder. For example, the beverage container holder can be conveniently located in the center console, which usually has other compartments for holding miscellaneous items, such as music compact discs, sunglasses, cellular phones, and change. It is often desirable for the beverage container holder to hold two beverage containers so that the driver and the passenger can simultaneously utilize the beverage container holder. Additionally, the beverage container holder usually includes an adjustment mechanism for adjusting the size of the beverage container opening in the compartment so that beverage containers of various sizes can fit in the opening and be held securely therein in a stable, upright position. Some beverage container holders having two beverage container openings comprise a single adjustment mechanism that adjusts the size of both openings at the same time. Such a holder is useful when both persons in the automobile have the same beverage containers; however, with the large variety of beverage containers available today, it is common that the occupants of the vehicle have cups, glasses, cans, mugs, bottles, and the like that differ in shape and size. Other beverage container holders comprise various types of adjustment mechanisms that adjust the sizes of the openings independently, but these mechanisms can be inconvenient to use and expensive to manufacture.

SUMMARY OF THE INVENTION

A vehicular beverage container holder according to the invention comprises a receptacle having an elongated compartment and an adjuster assembly mounted across the receptacle to divide the compartment into beverage container compartments, one on each side of the adjuster assembly, for holding beverage containers. A peripheral cover overlies the side edges of the adjuster assembly and the periphery of the receptacle to facilitate mounting the adjuster assembly to the receptacle and to provide an aesthetic appearance to the container holder.

The adjuster assembly comprises a body defining a longitudinal channel that slidably receives a pair of identical adjusters extending from opposite sides of the channel. Each of the adjusters comprises opposing side edges joined at one end by an arcuate rear edge and at the other end by an arcuate front edge. The adjusters project into the two beverage container compartments to define container openings therefor between the front edges of the adjusters and the respective ends of the compartment. The size of the container openings depends on the extent to which the adjusters project into the beverage container compartments.

The adjuster assembly further comprises a knob and gear assembly mounted to the body and coupled with the adjusters so that rotational movement of the knob and gear assembly effects sliding movement of the adjusters relative to the body to adjust the size of the respective container openings. The knob and gear assembly includes a slip clutch mechanism to decouple one of the adjusters from movement when a beverage container is inserted in the respective beverage container compartment while the knob and gear assembly continues to rotate to move the other adjuster and thereby adjust the size of the container opening for the other beverage container compartment. As a result of this configuration, the container openings can be sized so that a relatively large beverage container can be placed in one opening while a relatively small beverage container can be placed in the other opening, if desired. Additionally, each of the container openings can be adjusted to fit any size beverage container ranging between a maximum beverage container size and a minimum beverage container size corresponding to fully retracted and fully extended positions of the adjusters.

In one aspect, the invention relates to a vehicular beverage container holder comprising a first beverage receptacle, a second beverage receptacle, and a body located between the first beverage receptacle and the second beverage receptacle. The body can comprise a first adjuster movably mounted to the body between a retracted position with respect to the first beverage receptacle and an extended position into the first beverage receptacle, and a second adjuster movably mounted to the body between a retracted position with respect to the second beverage receptacle and an extended position into the second beverage receptacle. An actuator can be operably interconnected with each of the first adjuster and the second adjuster so that movement of the actuator can impart movement to both the first adjuster and the second adjuster to attempt to move each of the first adjuster and the second adjuster between their respective retracted and extended positions based upon the direction of movement of the actuator. The first adjuster can thereby project into the first beverage receptacle and the second adjuster can project into the second beverage receptacle to define container openings therefor between front edges of the adjusters and a remainder of the periphery of the first and second adjusters not defined by the first and second adjusters, and whereby the size of each of the first and second beverage receptacles depends on the extent to which the adjusters project therein based upon the movement of the actuator.

In another aspect, the invention relates to a vehicular beverage container holder divider adapted to convert an elongated recess in a vehicular console into a first beverage receptacle and a second beverage receptacle.

Various embodiments of the invention are also contemplated. For example, a slip clutch mechanism can be operably interconnected to the actuator and to at least one of the first and second adjusters to decouple the at least one of the first and second adjusters from movement between their respective retracted and extended positions when a beverage container is inserted in a respective first and second beverage receptacle. Each of the first and second adjusters can comprise a rack gear thereon. The actuator can comprise a pinion gear thereon operably interconnected to the rack gear on the each of the first and second adjusters. The actuator can comprise a user-actuatable portion operably interconnected with the pinion gear. The slip clutch can comprise a friction mounting located between the user-actuatable portion and the pinion gear wherein rotation of the user-actuatable portion will rotate the pinion gear as long as a predetermined level of friction is maintained between the user-actuatable portion and the pinion gear, and wherein, once the predetermined friction level is overcome, the user-actuatable portion is decoupled from the pinion gear. A spring can bias the user-actuatable portion against the pinion gear to assist in maintaining the friction mounting therebetween.

The slip clutch can decouple the user-actuatable portion from the pinion gear when a beverage container abuts at least one of the first and second adjusters in the respective first and second beverage receptacles. When beverage containers of different sizes are placed in the first and second beverage receptacles, the slip clutch can allow movement of one of the first and second adjusters corresponding to the smaller of the beverage containers while simultaneously decoupling movement of the other of the first and second adjusters corresponding to the larger of the beverage containers of different sizes.

The first beverage receptacle and the second beverage receptacle can be formed as opposed ends of a common chamber and the body divides the common chamber into the first beverage receptacle and the second beverage receptacle. A peripheral cover can overlie side edges of the body and a periphery of the first and second beverage receptacles to facilitate mounting the body to the receptacles and to provide an aesthetic appearance to the vehicular beverage container holder. Each of the first and second adjusters can comprise opposing side edges joined at one end by an arcuate rear edge and at the other end by an arcuate front edge. The actuator can be mounted to the body. The actuator can be rotatably mounted to the body. Each of the first and second adjusters can comprise a rack gear thereon. The actuator can comprise a pinion gear thereon operably interconnected to the rack gear on the each of the first and second adjusters.

DESCRIPTION OF THE PREFERRED EMBODIMENT

Figure 1:
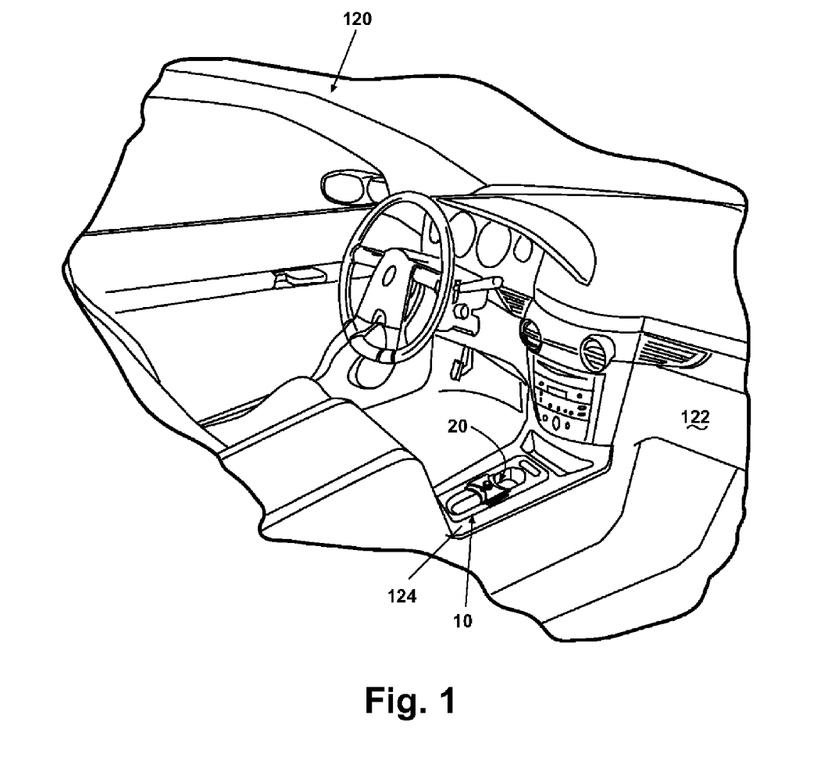
FIG. 1 is a perspective view of a vehicle front cabin with a center console having a beverage container holder according to the invention.

Referring to the figures and particularly to FIG. 1, a beverage container holder 10 according to invention for use in a vehicle 120 comprises an adjuster assembly 20 that can be adjusted by a vehicle occupant so that the beverage container holder 10 can accommodate a plurality of beverage containers of differing size at the same time. Preferably, the beverage container holder 10 is located in the front cabin 122 of the vehicle 120 and, more preferably, in a center console 124 in the front cabin 122 of the vehicle 120. However, it is within the scope of the invention for the beverage container holder 10 to be positioned in any area of the front cabin 122 or other interior regions of the vehicle 120.

Figure 2:
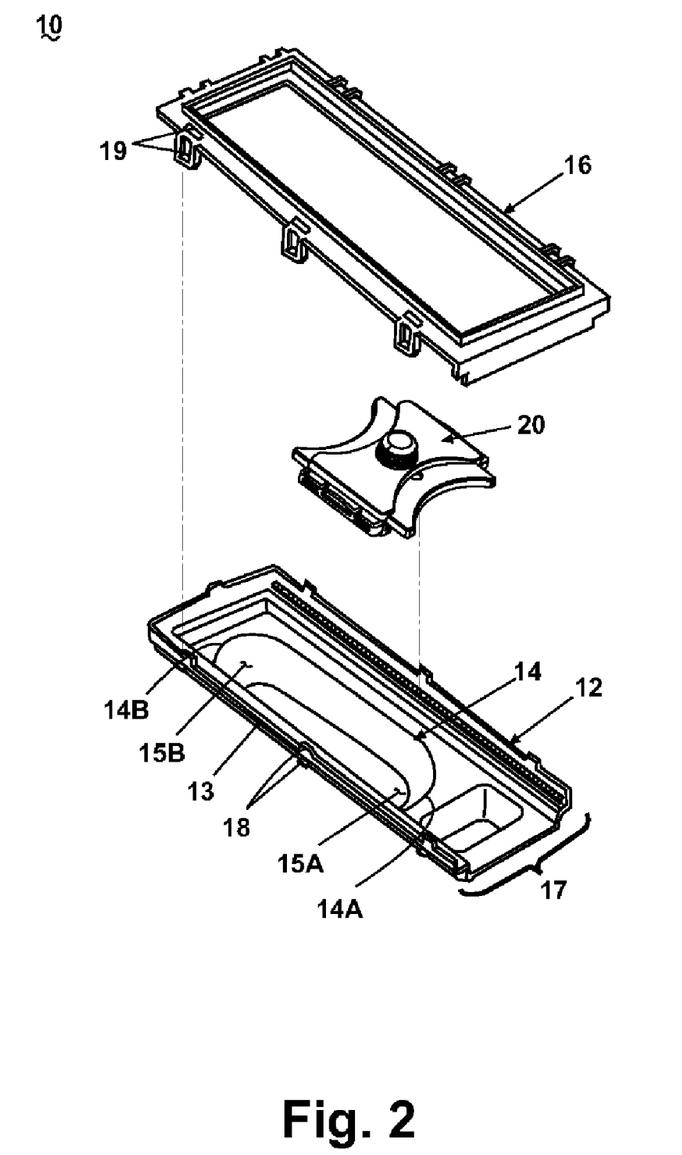
FIG. 2 is an exploded view of the beverage container holder of FIG. 1.

Referring now to FIG. 2, the beverage container holder 10 comprises a generally rectangular receptacle 12 having a peripheral rim 13 with an open end 17 and an elongated, generally oval compartment 14 with a first end 14A and a second end 14B. The adjuster assembly 20 is mounted across the receptacle 12 to define first and second beverage container compartments 15A, 15B within the compartment 14. The first and second beverage container compartments 15A, 15B are located on opposite sides of the adjuster assembly 20, and each is sized to receive an individual beverage container. Preferably, the adjuster assembly 20 can slide along the receptacle 12 to inversely adjust the relative sizes of the first and second beverage container compartments 15A, 15B. When the adjuster assembly 20 is located at the center of the compartment 14, the first and second beverage container compartments 15A, 15B are substantially equal. A peripheral cover 16 overlies the sides of the adjuster assembly 20 and the peripheral rim 13 of the receptacle 12 to facilitate mounting the adjuster assembly 20 to the receptacle 12 and to provide an aesthetic appearance to the beverage container holder 10. The receptacle 12 and the cover 16 comprise mating tabs 18 and detents 19, respectively, to secure the cover 16 to the receptacle 12.

Figure 3:
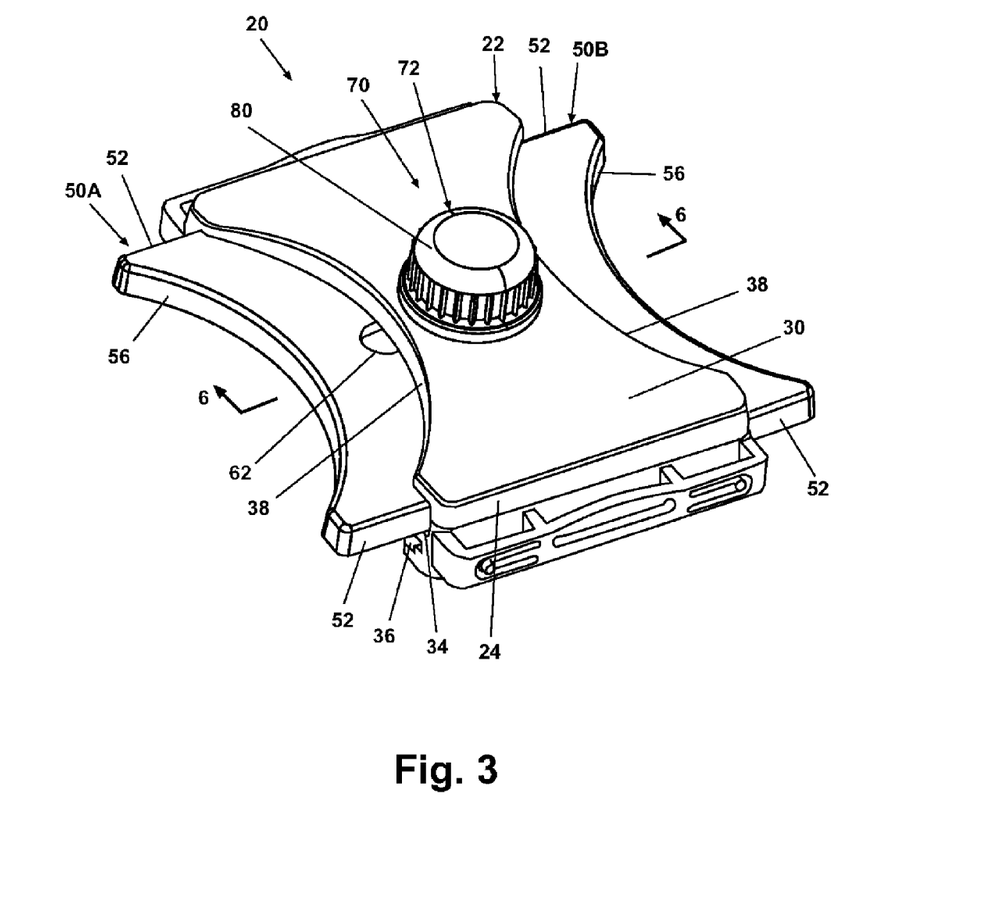
FIG. 3 is a perspective view of an adjuster assembly from the beverage container holder of FIG. 1.
Figure 4A:
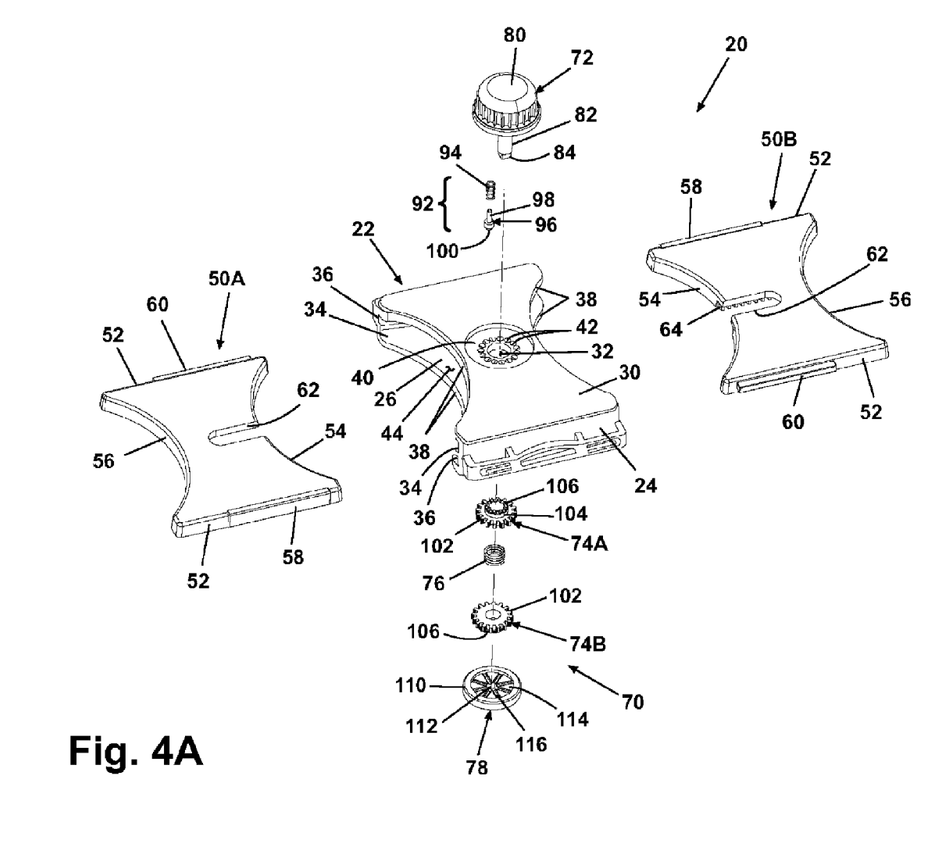
FIG. 4A is a top exploded view of the adjuster assembly of FIG. 3.
Figure 4B:
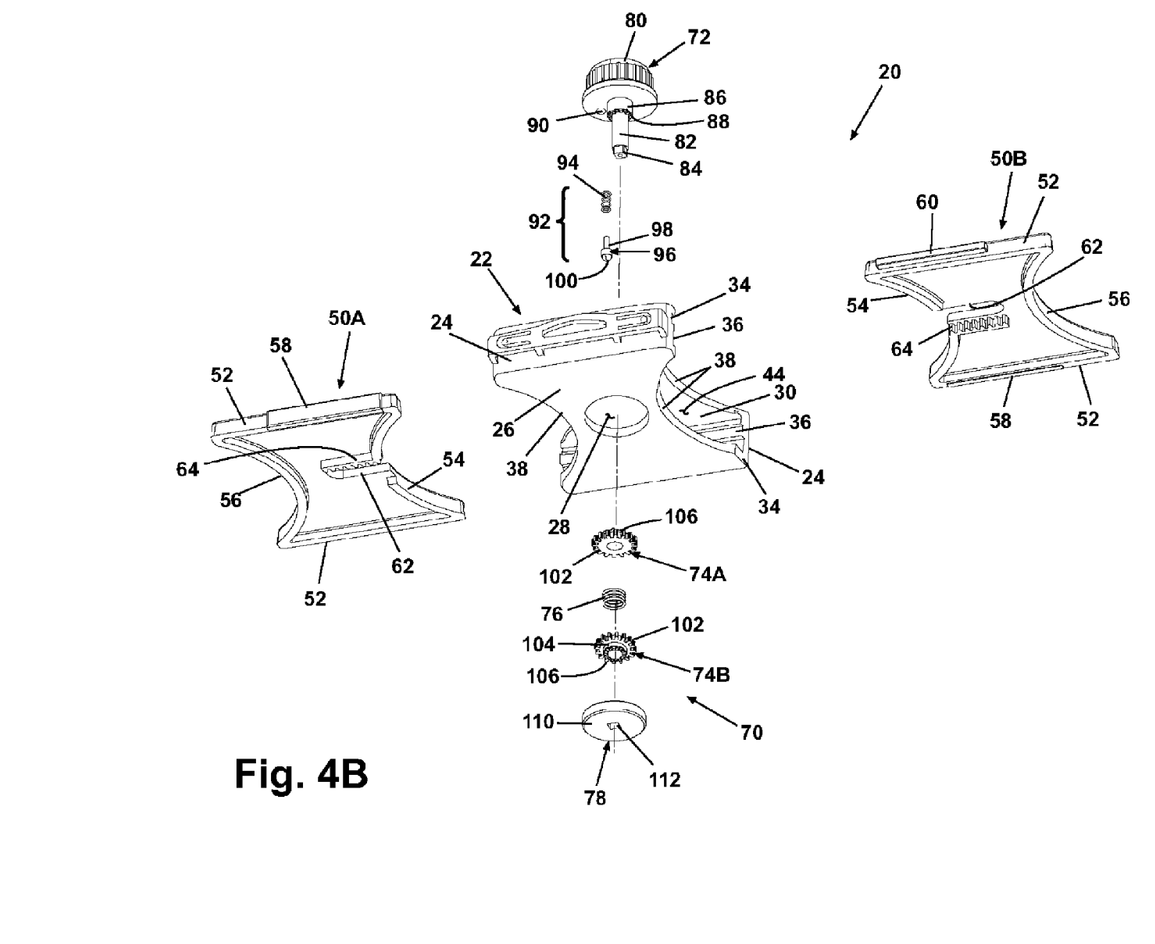
FIG. 4B is a bottom exploded view of the adjuster assembly of FIG. 3.
Figure 5:
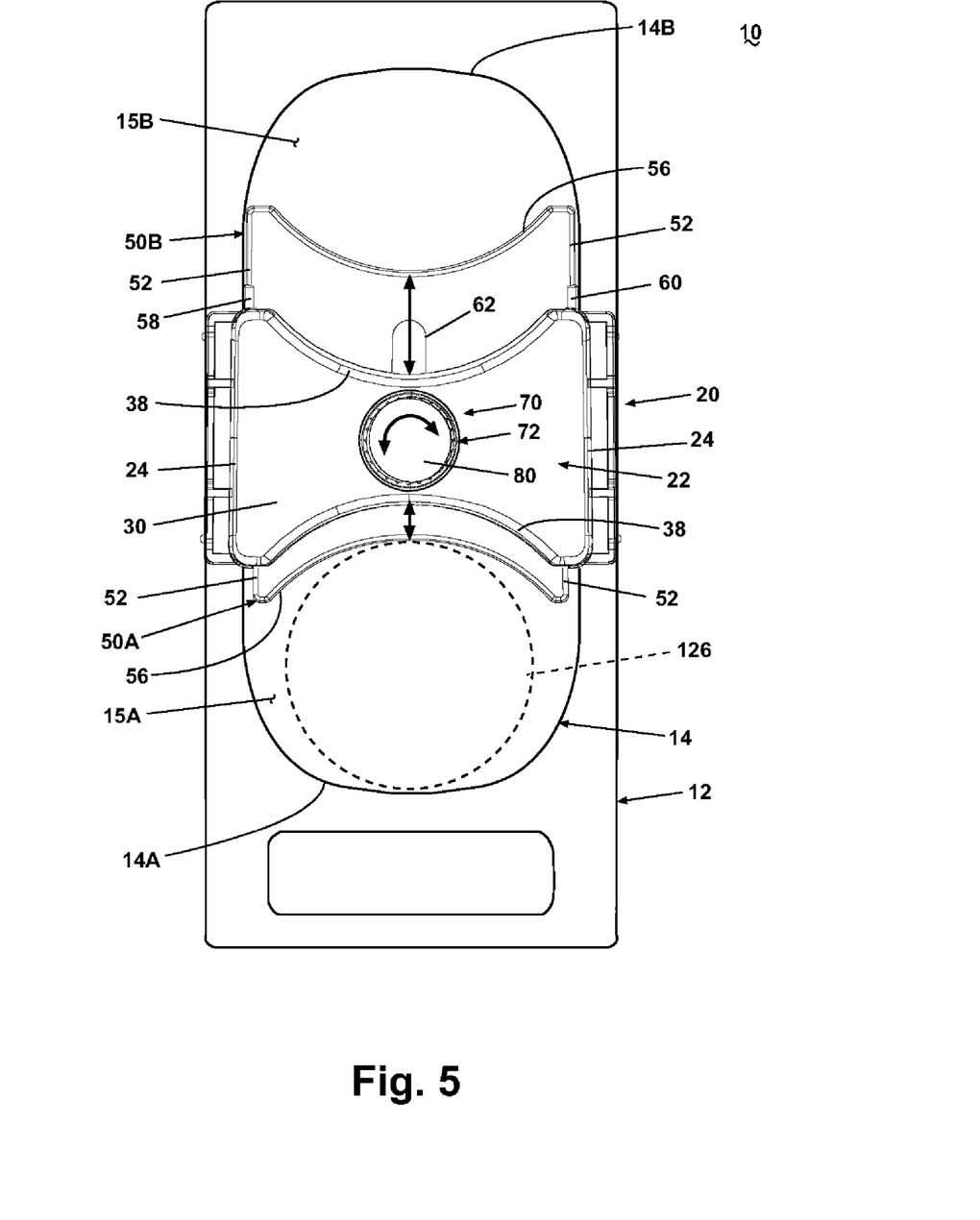
FIG. 5 is a partial schematic view of the beverage container holder of FIG. 1 with the adjusters positioned to hold a single beverage container.

Referring now to FIGS. 3-5, the adjuster assembly 20 comprises a generally hollow H-shaped body 22 having straight, opposing side walls 24 joined by a bottom wall 26 with a central opening 28 and an upper wall 30 with a central opening 32 axially aligned with the central opening 28 in the bottom wall 26. The inside surface of each side wall 24 includes a first groove 34 and a second groove 36, wherein the first groove 34 is larger than the second groove 36. The first and second grooves 34, 36 are vertically disposed relative to one another, and the relative orientation of the first and second grooves 34, 36 is opposite on the side walls 24. In other words, the first groove 34 is above the second groove 36 on one of the side walls 24, while the second groove 36 is above the first groove 34 on the other of the side walls 24. Consequently, the first groove 34 on one of the side walls 24 is horizontally aligned with the second groove 36 on the other of the side walls 24. Preferably, the second groove 36 has an open end and a closed end for purposes to be discussed hereinafter. Each of the bottom wall 26 and the upper wall 30 is bounded by arcuate edges 38 that span between the side walls 24. The central opening 32 in the upper wall 30 is surrounded by an annular depression 40 having a plurality of dimples 42 arranged in a circle around the central opening 32. The body 22 further includes a longitudinal channel 44 extending between the bottom and upper walls 26, 30 and first and second grooves 34, 36 on the side walls 24.

The channel 44 slidably receives a pair of preferably identical adjusters 50A, 50B that extend from opposite sides of the channel 44. Each of the adjusters 50A, 50B comprises opposing side edges 52 joined at a rear end by an arcuate rear edge 54 and at a front end by an arcuate front edge 56, and each of the rear and front edges 54, 56 has a radius of curvature similar to that of the arcuate edges 38 of the body bottom and upper walls 26, 30. One of the side edges 52 includes a first elongated guide 58 that extends from the rear edge 54 towards the front edge 56, and the other of the side edges 52 has a second elongated guide 60 that also extends from the rear edge 54 towards the front edge 56. The first elongated guide 58 is taller than the second elongated guide 60, and the first and second elongated guides 58, 60 are sized for sliding receipt within the first and second grooves 34, 36 in the body side walls 24. In particular, the second elongated guide 60 is received in the open end of the second groove 36. The length of each of the first and second guides 58, 60 is preferably about three quarters of the length of the side edges 52. Additionally, each of the adjusters 50A, 50B forms a slot 62 that is open at the rear edge 54 and extends toward the front edge 56 and parallel to the side edges 52. A rack gear 64 positioned adjacent and parallel to the slot 62 runs from the rear edge 54 and along one side of the slot 62. The adjusters 50A, 50B are vertically juxtaposed relative to one another and project into the first and second beverage container compartments 15A, 15B to define container openings between the front edges 56 of the adjusters 50A, 50B and the respective ends 14A, 14B of the compartment 14, as shown in FIG. 5. The size of the container openings depends on the extent to which the adjusters 50A, 50B project into the first and second beverage container compartments 15A, 15B.

Figure 6:
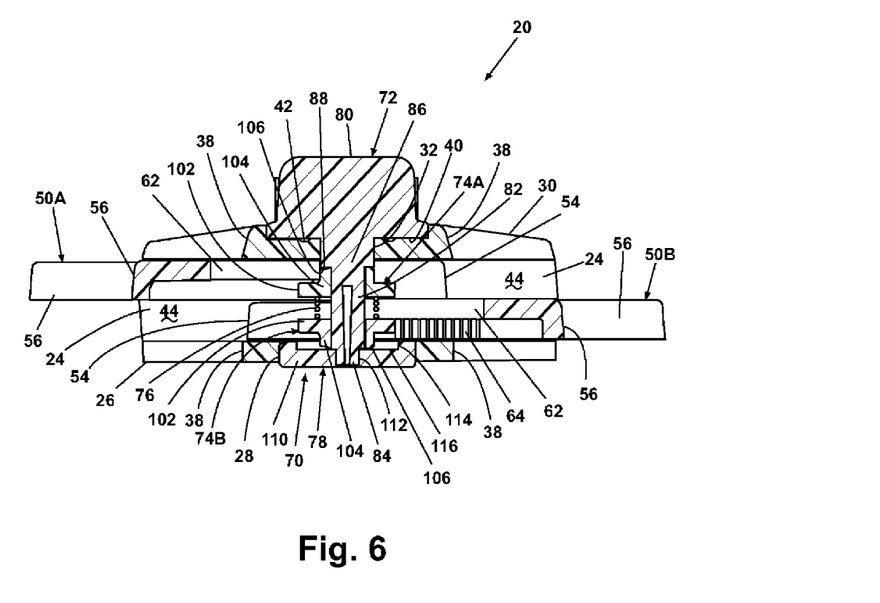
FIG. 6 is a sectional view taken along line 6-6 of FIG. 3.
Figure 7:
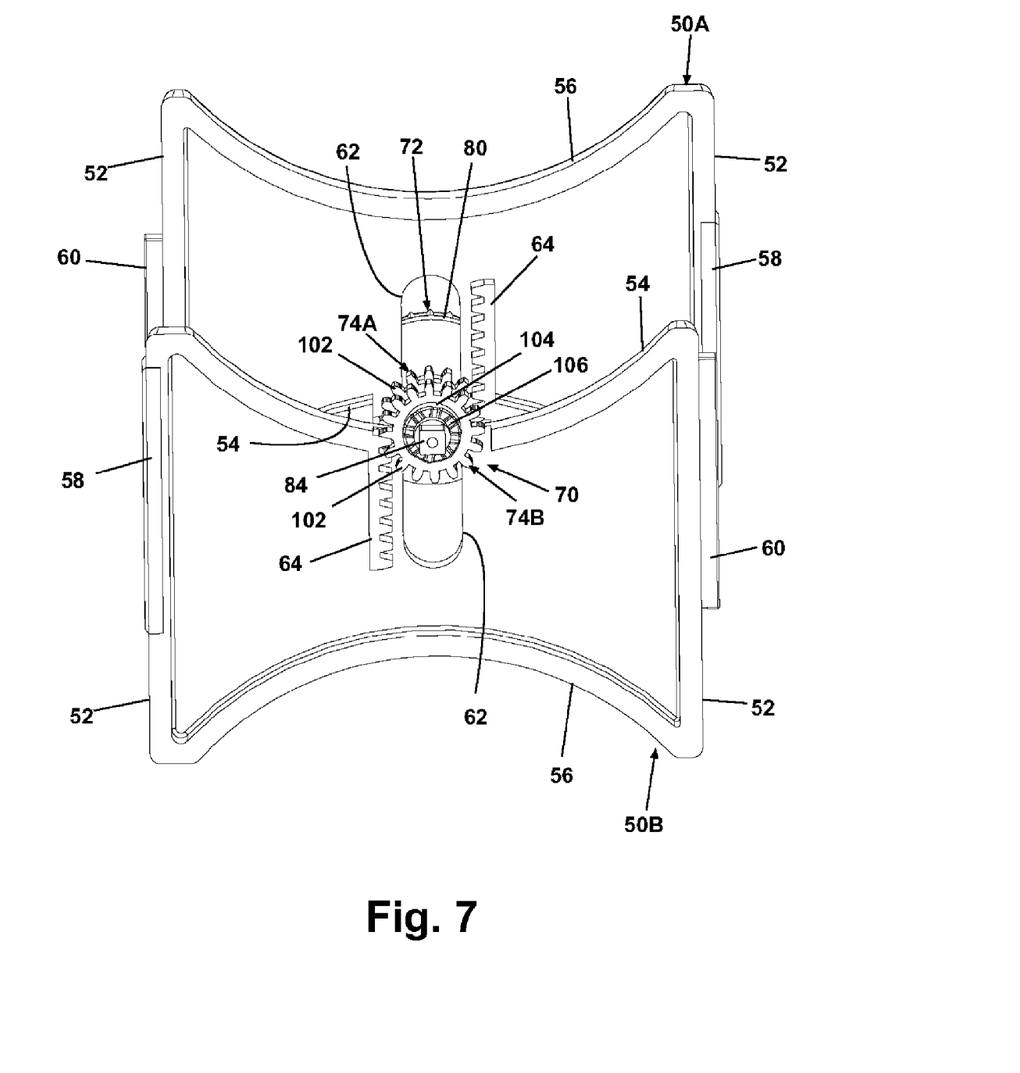
FIG. 7 is a bottom perspective view of a pair of adjusters with gear racks and corresponding pinions of a knob and gear assembly from the adjuster assembly of FIG. 3.

Referring additionally to FIGS. 6 and 7, the adjuster assembly 20 further comprises a knob and gear assembly 70 mounted to the body 22 and operatively coupled to the adjusters 50A, 50B for moving the adjusters 50A, 50B relative to the body 22 to increase or decrease the size of the container openings. The knob and gear assembly 70 comprises a knob 72 that mounts upper and lower pinions 74A, 74B, a biasing member 76, and a bottom support 78. The bottom support 78 is not shown in FIG. 7 to better illustrate the interaction between the upper and lower pinions 74A, 74B and the adjusters 50A, 50B.

The knob 72 has a generally circular grip 80 sized for receipt within the depression 40 of the body 22 and a cylindrical shaft 82 depending from the grip 80 and sized for receipt in the central opening 32 of the body 22. The shaft 82 terminates in a generally square key 84 and includes a clutch member 86 located at the junction between the shaft 82 and the grip 80 and having a ratcheted surface 88 at a lower end thereof. The knob 72 further includes a generally cylindrical recess 90 in a lower surface of the grip 80 and offset from the shaft 82 for receiving a detent assembly 92 comprising a detent biasing member 94 and a detent pin 96. The detent pin 96 comprises a shaft 98 and a downwardly oriented head 100 sized for partial receipt within the dimples 42 in the body 22. The detent biasing member 94, which is shown as a coil spring, surrounds the shaft 98 and abuts the grip 80 at one end and the head 100 at the other end to bias the detent pin 96 away from the grip 80 and towards the dimples 42 in the body 22.

The upper and lower pinions 74A, 74B are substantially identical and comprise a generally circular pinion portion 102 and a coaxial clutch portion 104 extending from the pinion portion 102 and terminating in a ratcheted surface 106. The pinion portions 102 are designed to mate with the rack gears 64 of the adjusters 50A, 50B. The upper and lower pinions 74A, 74B are disposed on the shaft 82 of the knob 72 in opposing relationship with the biasing member 76 therebetween. The upper pinion 74A is oriented such that the ratcheted surface 106 abuts the ratcheted surface 88 of the clutch member 86 on the grip 80, and the lower pinion 74B is oriented such that its ratcheted surface 106 faces away from the upper pinion 74A and towards bottom support 78.

The bottom support 78 comprises a generally circular body 110 sized to be received in the central opening 28 in the bottom wall 26 of the body 22. The body 110 has a generally square keyed aperture 112 sized to receive and retain the key 84 of the knob shaft 82 so that the bottom support 78 moves with the knob 72 when the user rotates the grip 80 of the knob 72. The key 84 can be secured to the bottom support 78 in any suitable manner. In the illustrated embodiment, the shaft 82 is made of a resilient material and includes a central bore (FIG. 6) so that the key 84 on the shaft 82 can be slightly compressed for insertion into the keyed aperture 112 and form a compression fit therewith. An annular depression 114 formed in an upper surface of the body 110 includes a ratcheted surface 116 that mates with the ratcheted surface 106 of the lower pinion 74B. The biasing member 76 biases the upper and lower pinions 74A, 74B away from one another to force the respective ratcheted surfaces 106 into the ratcheted surface 88 of the grip 110 and the ratcheted surface 116 of the bottom support 78.

Preferably, the body 22, the adjusters 50A, 50B, the components of the knob and gear assembly 70, except the biasing member 76 and the detent biasing member 94, and the receptacle 12 are composed of a polymeric material and are produced with a suitable molding, extrusion, or forming process. Further, the cover 16 is preferably made of a polymeric material, such as a thermoplastic, during a suitable molding, extrusion, or forming process.

An exemplary description of the assembly of the beverage container holder 10 follows. It will be apparent to one of ordinary skill that the assembly can proceed in any logical order and is not limited to the sequence presented below. The following description is for illustrative purposes only and is not intended to limit the invention in any way.

The adjuster assembly 20 is assembled by first mounting the knob and gear assembly 70 to the body 22 by inserting the shaft 82 of the knob 72 into the opening 32 in the upper wall 30 of the body 22 until the grip 80 is seated in the depression 40 and the head 100 of the detent pin 96 is seated in one of the dimples 42. Next, the upper pinion 74A is slid onto the shaft 82 through the opening 28 in the bottom wall 26 of the body 22 with the clutch portion 104 facing the grip 80, and the biasing member 76 is slid onto the shaft 82 after the upper pinion 74A. After the upper pinion 74A and the biasing member 76 are on the shaft 82, the lower pinion 74B is slid onto the shaft 82 with the clutch portion 104 facing away from the grip 80 so that the biasing member 76 abuts the pinion portions 102 of the upper and lower pinions 74A, 74B. Finally, the bottom support 78 is mounted to the shaft 82 by inserting the keyed aperture 112 onto the key 84 to secure the bottom support 78 thereto. When the knob and gear assembly 70 is assembled to the body 22, the biasing member 76 biases the ratcheted surface 106 of the upper pinion 74A into mating contact with the ratcheted surface 88 of the knob clutch member 86 and the ratcheted surface 106 of the lower pinion 74B into mating contact with the ratcheted surface 116 of the bottom support 78, as shown in FIG. 6. While the ratcheted surface 106 of the upper pinion 74A is in mating contact with the ratcheted surface 88 of the knob clutch member 86, rotation of the knob clutch member 86 via rotation of the knob 72 induces rotation of the upper pinion 74A. Similarly, while the ratcheted surface 106 of the lower pinion 74B is in mating contact with the ratcheted surface 116 of the bottom support 78, rotation of the bottom support 78 via rotation of the knob 72 induces rotation of the lower pinion 74B.

Next, the adjusters 50A, 50B are inserted into opposite sides of the channel 44. In particular, the rear edge 54 of the adjuster 50A is inserted into the channel 44 with the first and second guides 58, 60 on the adjuster 50A slidably received in the first and second grooves 34, 36 of the body 22 and the slot 62 aligned with the clutch portion 104 of the upper pinion 74A. When the clutch portion 104 enters the slot 62, the pinion portion 102 engages the rack gear 64, as shown in FIG. 7. As a result of this relationship, rotation of the upper pinion 74A induces sliding movement of the adjuster 50A relative to the body 22. The adjuster 50B is inserted into the opposite side of the channel 44 from the adjuster 50A in the manner as described above with respect to the adjuster 50A, except that the adjuster 50B is inserted such that the slot 62 and the rack gear are aligned with the clutch portion 104 and the pinion portion 102, respectively, of the lower pinion 74B. Consequently, rotation of the lower pinion 74B induces sliding movement of the adjuster 50B relative to the body 22.

After the adjuster assembly 20 is assembled, it is slid onto the peripheral rim 13 of the receptacle 12 at the open end 17 until it is positioned approximately halfway between the first end 14A and the second end 14B of the compartment 14 to define the first and second beverage container compartments 15A, 15B and the corresponding container openings. Finally, the cover 16 is positioned on the peripheral rim 13 and over the adjuster assembly 20, and the tabs 18 mate with the detents 19 to secure the cover 16 to the receptacle 12.

An exemplary description of the operation of the beverage container holder 10 follows. It will be apparent to one of ordinary skill that the operation can proceed in any logical order and is not limited to the sequence presented below. The following description is for illustrative purposes only and is not intended to limit the invention in any way.

When the beverage container holder 10 is assembled, the biasing member 76 of the knob and gear assembly 70 biases the ratcheted surface 106 of the upper pinion 74A into mating contact with the ratcheted surface 88 of the knob clutch member 86 and the ratcheted surface 106 of the lower pinion 74B into mating contact with the ratcheted surface 116 of the bottom support 78, as described above. Additionally, the pinion portions 102 of the upper and lower pinions 74A, 74B mesh with the rack gears 64 of the respective adjusters 50A, 50B. As a result, rotation of the grip 80 of the knob 72 clockwise relative to the orientation of FIG. 5 simultaneously moves the adjusters 50A, 50B toward the respective first and second ends 14A, 14B of the compartment 14 to thereby decrease the size of the respective container openings for the first beverage container compartment 15A and the second beverage container compartment 15B, as indicated by arrows in FIG. 5. Conversely, rotation of the grip 80 of the knob 72 counterclockwise relative to the orientation of FIG. 5 simultaneously retracts the adjusters 50A, 50B into the body 22 and away from the respective first and second ends 14A, 14B of the compartment 14 to thereby increase the size of the respective container openings for the first beverage container compartment 15A and the second beverage container compartment 15B. As the knob 72 rotates to move the adjusters 50A, 50B relative to the body 22, the first and second guides 58, 60 of each of the adjusters 50A, 50B slide within the first and second grooves 34, 36, respectively, of the body 22.

During rotation of the knob 72, the detent pin 96 moves into progressive mating engagement with the dimples 42 in the depression 40 of the body upper wall 30. When the detent pin 96 mates with one of the dimples 42, the detent biasing member 94 biases the head 100 of the detent pin 96 into abutting contact with one of the dimples 42. As the detent pin 96 moves between adjacent dimples 42, the detent pin 96 moves upward in the recess 90 against the force of the detent biasing member 94. Consequently, when the vehicle occupant rotates the knob 72, the detent assembly 92 provides tactile "positions" for the knob and gear assembly 70. As a result, the vehicle occupant naturally ceases rotation of the knob 72 when the knob 72 is in a position where the detent pin 96 abuts one of the dimples 42. Advantageously, the interaction between the detent pin 96 and the abutting dimple 42 prevents undesired movement of the adjusters 50A, 50B potentially caused by, for example, vibrations of the vehicle 120 during movement thereof.

When the vehicle occupant desires to position a single beverage container 126 in the beverage container holder 10, the vehicle occupant adjusts the size of the container openings according to the size of the single beverage container 126 by rotating the knob 72, which induces sliding movement of the adjusters 50A, 50B as described above, and inserts the single beverage container 126 into either of the container openings for the first and second beverage container compartments 15A, 15B. The remainder of the description for the single beverage container 126 assumes that the single beverage container 126 is positioned in the first beverage container compartment 15A. Once the single beverage container 126 is in the beverage container holder 10, the vehicle occupant can rotate the grip 80 clockwise until the arcuate front edge 56 of the adjuster 50A abuts or nearly abuts the single beverage container 126 to snugly retain the beverage container between the adjuster 50A and the first end 14A of the compartment 14, if desired. As a result, the single beverage container 126 is securely held in the beverage container holder 10 but can be removed by the occupant when desired, such as for consumption, and subsequently returned to the beverage container holder 10.

If the user continues to rotate the knob 72 after the adjuster 50A abuts the single beverage container 126, the ratcheted surface 88 of the clutch member 86 continues to rotate with the knob 72, but the upper pinion 74A can no longer rotate with the clutch member 86 because sliding movement of the adjuster 50A toward the first end 14A of the compartment 14 is retarded by the single beverage container 126. Consequently, the ratcheted surface 106 on the clutch portion 104 of the upper pinion 74A rides or slips, as in a slip clutch, along the ratcheted surface 88 of the clutch member 86, which forces the upper pinion 74A to move slightly downward against the force of the biasing member 76. While the upper pinion 74A slips with respect to the clutch member 86, the lower pinion 74B continues to rotate with the knob 72, thereby sliding the adjuster 50B relative to the body 22. Continued movement of one of the adjusters 50A, 50B while the other of the adjusters 50A, 50B is important in a situation where two beverage containers of differing size are placed in the beverage container holder 10, as will be described in detail hereinafter.

If the single beverage container 126 is placed in the second beverage container compartment 15B rather than the first beverage container compartment 15A, the operation of the beverage container holder 10 is substantially the same. However, if the user continues to rotate the knob 72 after the adjuster 50B abuts the single beverage container 126, the lower pinion 74B corresponding to the adjuster 50B slips. In particular, the ratcheted surface 116 of the bottom support 78 continues to rotate with the knob 72, but the lower pinion 74B can no longer rotate with the bottom support 78 because sliding movement of the adjuster 50B toward the second end 14B of the compartment 14 is retarded by the single beverage container 126. Consequently, the ratcheted surface 106 on the clutch portion 104 of the lower pinion 74B rides or slips, as in a slip clutch, along the ratcheted surface 116 of the bottom support 78, which forces the lower pinion 74B to move slightly upward against the force of the biasing member 76.

Figure 8:
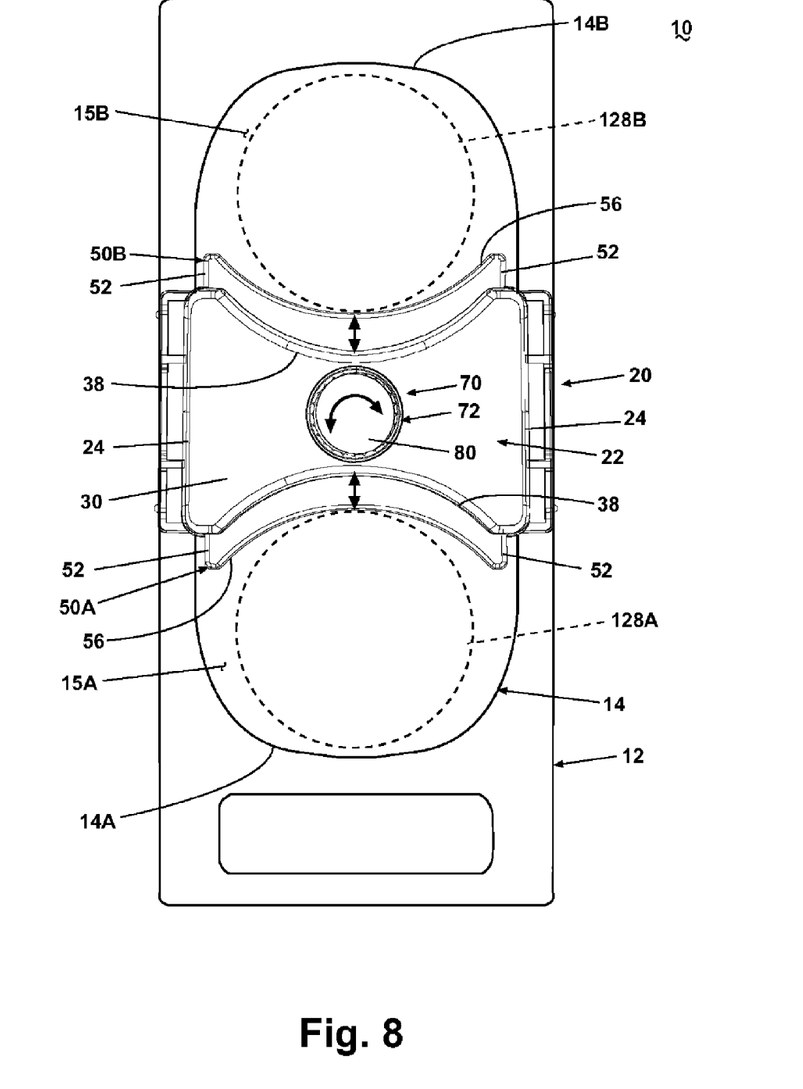
FIG. 8 is a partial schematic view similar to FIG. 5, with the adjusters positioned to hold a two beverage containers of generally the same size.

When the vehicle occupant desires to position two beverage containers 128A, 128B of generally the same size (i.e. same circumference where the adjuster meets the beverage container) in the beverage container holder 10, as shown in FIG. 8, the operation is substantially identical to the operation described above with respect to the single beverage container 126. The only difference in the operation occurs when the vehicle occupant rotates the grip 80 clockwise with respect to the orientation of FIG. 8 to move the adjusters 50A, 50B into abutting contact with the respective beverage containers 128A, 128B. In this case, the beverage containers 128A, 128B retard sliding movement of both of the adjusters 50A, 50B when the arcuate front edges 56 abut the respective beverage containers 128A, 128B.

The operation of the beverage container holder 10 with beverage containers of differing size will now be described with respect to FIG. 9. When a vehicle occupant desires to position a first beverage container 130 in the first beverage container compartment 15A and a second beverage container 132 smaller than the first beverage container 130 in the second beverage container compartment 15B, the occupant determines whether the container openings are large enough to receive the first and the second beverage containers 130, 132. If at least one of the container openings is not large enough, then the occupant grasps the grip 80 on the knob 72 and turns the grip 80 counterclockwise relative to the orientation of FIG. 9 to retract the first and the second adjusters 50A, 50B to a position wherein the container opening are large enough to receive the first and the second beverage containers 130, 132 (i.e., the container opening of the first beverage container compartment 15A is large enough to receive the first beverage container 130 and the container opening of the second beverage container compartment 15B is large enough to receive the second beverage container 132).

Figure 9:
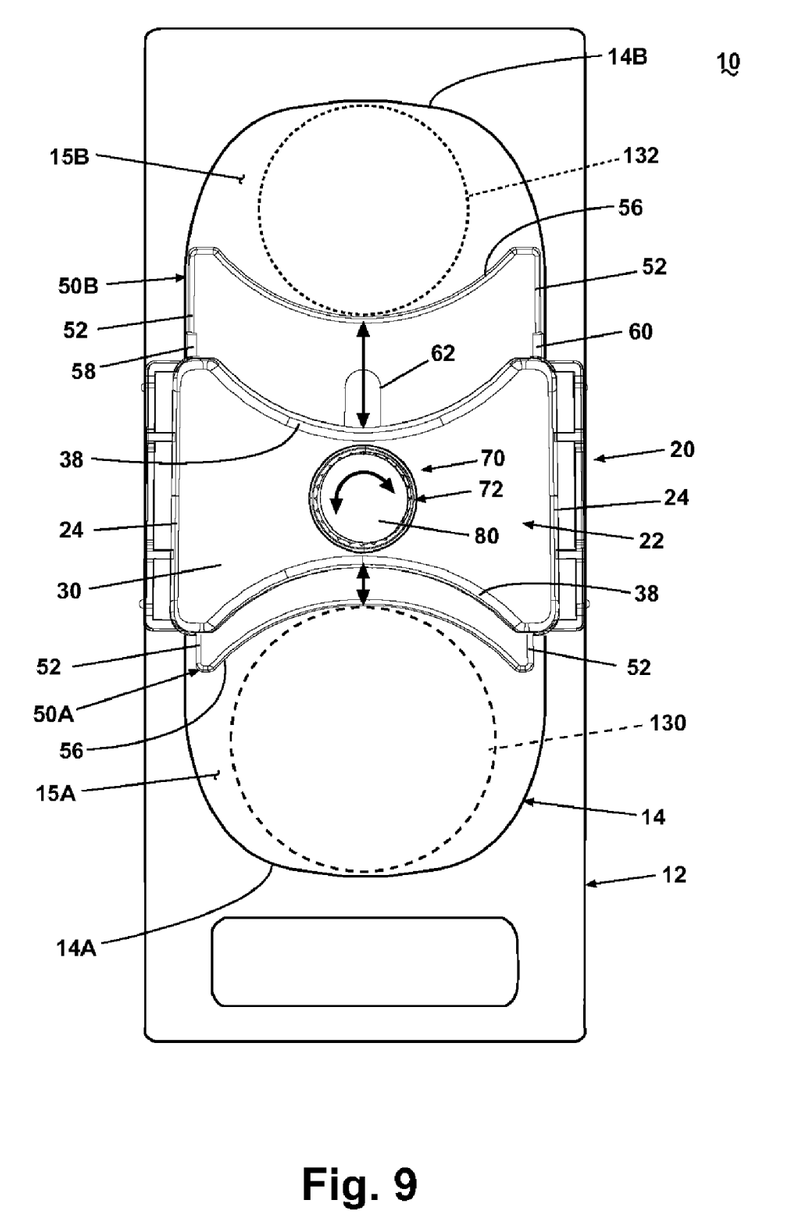
FIG. 9 is a partial schematic view similar to FIG. 5, with the adjusters positioned to hold two beverage containers of differing size.

Next, the occupant places the first and the second beverage containers 130, 132 in the respective beverage container compartments 15A, 15B and turns the grip 80 on the knob 72 clockwise relative to the orientation of FIG. 9 to move the adjusters 50A, 50B towards the first end 14A and the second end 14B, respectively, of the compartment 14 to decrease the size of the container openings. As the occupant turns the knob 72, the adjuster 50A slides towards the first end 14A of the compartment 14, and the adjuster 50B simultaneously slides towards the second end 14B of the compartment. Because the first beverage container 130 is larger than the second beverage container 132, the adjuster 50A abuts the first beverage container 130 before the adjuster 50B abuts the second beverage container 132. Hence, the first beverage container 130 stops sliding movement of the adjuster 50A, and the upper pinion 74A slips while the occupant continues to rotate the knob 72, as described above. The occupant rotates the knob 72 until the adjuster 50B abuts the second beverage container 132, as shown in FIG. 9. In this position, the first beverage container 130 snugly fits between the arcuate front edge 38 of the adjuster 50A and the first end 14A of the compartment 14, and the second beverage container 132 snugly fits between the arcuate front edge 38 of the adjuster 50B and the second end 14B of the compartment 14. As a result, the first and the second beverage containers 130, 132 of differing size are securely held in the beverage container holder 10 but can be removed individually by the occupant(s) when desired, such as for consumption, and subsequently returned to the beverage container holder 10.

Alternatively, the first, larger beverage container 130 can be positioned in the second beverage container compartment 15B with the second, smaller beverage container 132 in the first beverage container compartment 15A. In this case, the operation is substantially the same, except that the lower pinion 74B slips instead of the upper pinion 74A when the adjuster 50B abuts the first beverage container 130, and the upper pinion 74A slips instead of the lower pinion 74B when the adjuster 50A abuts the second beverage container 132.

Furthermore, the beverage containers 130, 132 can be placed in the beverage container holder 10 at different times rather than at the same time as described above. Operation of the beverage container holder 10 proceeds in a similar fashion.

The above descriptions of the operation of the beverage container holder 10 assume that the adjusters 50A, 50B are at substantially the same initial position with respect to the body 22. However, the adjusters 50A, 50B need not be at the same initial position; rotation of the knob 72 effects movement, whether retraction or extension, of the adjusters 50A, 50B regardless of their initial positions. Movement of the adjusters 50A, 50B ceases when the adjusters 50A, 50B are fully retracted (i.e., the end of the slot 62 near the front edge 56 abuts the clutch portion 104 of the pinion 74) or when the adjusters 50A, 50B abut a beverage container. Therefore, the vehicle occupant simply continues rotation of the knob 72 after movement of one of the adjusters 50A, 50B ceases to move the other of the adjusters 50A, 50B to a desired position.

The first and the second beverage containers 130, 132 illustrated in FIG. 9 are shown for exemplary purposes as relatively small and relatively large; however, the container openings for each of the beverage container compartments 15A, 15B can be sized according to any size beverage container having a diameter or cross-section ranging between a maximum beverage container size and a minimum beverage container size, which are defined by fully retracted and fully extended positions of the adjusters 50A, 50B relative to the body 22. The body 22 and the slot 62 of the adjusters 50A, 50B can be sized so that the adjusters 50A, 50B are fully received within the channel 44 and, therefore, fully concealed by the body 22 when fully retracted. Movement of the adjusters 50A, 50B beyond the fully retracted position is prevented by the closed end of the second groove 36. Alternatively, the adjusters 50A, 50B can project from the channel 44 a predetermined distance when fully retracted. When fully extended, the adjusters 50A, 50B can be positioned any suitable distance from the ends 14A, 14B of the compartment 14. Further, the adjusters 50A, 50B can comprise a stop on at least one the side edges 52 and near the rear edge 54 to prevent accidental detachment of the adjusters 50A, 50B from the body 22 when moving the adjusters 50A, 50B to the fully extended position. Preferably the stop functions only when the adjusters 50A, 50B are moving out of the channel 44 and, therefore, does not interfere with inserting the adjusters 50A, 50B into the body 22 during assembly.

The first and the second adjusters 50A, 50B can be moved by rotation of a single knob 72 to adjust the sizes of the container openings for the first and the second beverage container compartments 15A, 15B. As a result of the configuration of the knob and gear assembly 70, a relatively large beverage container can be placed in one opening and securely held therein while a relatively small container can be placed in the other opening and securely held therein. Further, the rack gear and pinion arrangement is a robust mechanism that is easily manipulated by the vehicle occupant through the grip 80 for efficiently moving the adjusters 50A, 50B through a range of positions.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicular beverage container holder comprising:
a first beverage receptacle;
a second beverage receptacle;
a body located between the first beverage receptacle and the second beverage receptacle, the body comprising:
a first adjuster movably mounted to the body between a retracted position with respect to the first beverage receptacle and an extended position into the first beverage receptacle; and
a second adjuster movably mounted to the body between a retracted position with respect to the second beverage receptacle and an extended position into the second beverage receptacle;
an actuator operably interconnected with each of the first adjuster and the second adjuster so that movement of the actuator can impart movement to both the first adjuster and the second adjuster to attempt to move each of the first adjuster and the second adjuster between their respective retracted and extended positions based upon the direction of movement of the actuator; and
the vehicular beverage container holder further comprising a slip clutch mechanism operably interconnected to the actuator and to at least one of the first and second adjusters to decouple the at least one of the first and second adjusters from movement between their respective retracted and extended positions when a beverage container is inserted in a respective first and second beverage receptacle;
whereby the first adjuster can project into the first beverage receptacle and the second adjuster can project into the second beverage receptacle to define container openings therefor between front edges of the adjusters and a remainder of the periphery of the first and second adjusters not defined by the first and second adjusters, and whereby the size of each of the first and second beverage receptacles depends on the extent to which the adjusters project therein based upon the movement of the actuator.

2. The vehicular beverage container holder of claim 1 wherein the slip clutch which decouples the actuator from at least one of the first and second adjusters when a beverage container abuts the at least one of the first and second adjusters in the respective first and second beverage receptacles.

3. The vehicular beverage container holder of claim 1 wherein, when beverage containers of different sizes are placed in the first and second beverage receptacles and the actuator is moved, the slip clutch allows movement of one of the first and second adjusters corresponding to the smaller of the beverage containers while simultaneously decoupling movement of the other of the first and second adjusters corresponding to the larger of the beverage containers of different sizes when the other of the first and second adjusters abuts the larger of the beverage containers.

4. The vehicular beverage container holder of claim 1 wherein the first beverage receptacle and the second beverage receptacle are formed as opposed ends of a common chamber and the body divides the common chamber into the first beverage receptacle and the second beverage receptacle.

5. The vehicular beverage container holder of claim 1 and further comprising a peripheral cover overlying side edges of the body and a periphery of the first and second beverage receptacles to facilitate mounting the body to the receptacles and to provide an aesthetic appearance to the vehicular beverage container holder.

6. The vehicular beverage container holder of claim 1 wherein each of the first and second adjusters comprises opposing side edges joined at one end by an arcuate rear edge and at the other end by an arcuate front edge.

7. The vehicular beverage container holder of claim 1 wherein the actuator is mounted to the body.

8. The vehicular beverage container holder of claim 1 wherein the actuator is rotatably mounted to the body.

9. The vehicular beverage container holder of claim 1 wherein the actuator comprises a user-actuatable portion operably interconnected with a pinion gear adapted to be operably interconnected to a rack gear on the each of the first and second adjusters.

10. The vehicular beverage container holder of claim 1 wherein the actuator comprises a user-actuatable portion operably interconnected with at least one of the first and second adjusters.

11. The vehicular beverage container holder of claim 10 wherein the slip clutch comprises a friction mounting located between the user-actuatable portion and the at least one of the first and second adjusters wherein rotation of the user-actuatable portion will move the at least one of the first and second adjusters as long as a predetermined level of friction is maintained between the user-actuatable portion and the at least one of the first and second adjusters, and wherein, once the predetermined friction level is overcome, the user-actuatable portion is decoupled from the at least one of the first and second adjusters.

12. The vehicular beverage container holder of claim 11 and further comprising a spring biasing the user-actuatable portion against the pinion gear to assist in maintaining the friction mounting therebetween.

13. The vehicular beverage container holder of claim 11 wherein the slip clutch decouples the user-actuatable portion from the at least one of the first and second adjusters when a beverage container abuts at least one of the first and second adjusters in the respective first and second beverage receptacles.

14. The vehicular beverage container holder of claim 13 wherein, when beverage containers of different sizes are placed in the first and second beverage receptacles, the slip clutch allows movement of one of the first and second adjusters corresponding to the smaller of the beverage containers while simultaneously decoupling movement of the other of the first and second adjusters corresponding to the larger of the beverage containers of different sizes.

15. The vehicular beverage container holder of claim 14 wherein the first beverage receptacle and the second beverage receptacle are formed as opposed ends of a common chamber and the body divides the common chamber into the first beverage receptacle and the second beverage receptacle.

16. The vehicular beverage container holder of claim 15 and further comprising a peripheral cover overlying side edges of the body and a periphery of the first and second beverage receptacles to facilitate mounting the body to the receptacles and to provide an aesthetic appearance to the vehicular beverage container holder.

17. The vehicular beverage container holder of claim 16 wherein each of the first and second adjusters comprises opposing side edges joined at one end by an arcuate rear edge and at the other end by an arcuate front edge.

18. The vehicular beverage container holder of claim 17 wherein the actuator is mounted to the body.

19. The vehicular beverage container holder of claim 18 wherein the actuator is rotatably mounted to the body.

20. The vehicular beverage container holder of claim 1, wherein each of the first and second adjusters comprises a rack gear thereon.

21. The vehicular beverage container holder of claim 20 wherein the actuator comprises a pinion gear thereon operably interconnected to the rack gear on the each of the first and second adjusters.

\* \* \* \* \*